United States Patent
Koeppen et al.

(10) Patent No.: US 8,928,171 B2
(45) Date of Patent: Jan. 6, 2015

(54) POWER DISTRIBUTION DEVICE FOR DISTRIBUTING POWER AND A METHOD FOR THE DISTRIBUTION OF POWER

(75) Inventors: Carsten Koeppen, Rellingen (DE); Sebastian Thiel, Buxtehude (DE)

(73) Assignee: Airbus Operations GmbH, Hamburg (DE)

(*) Notice: Subject to any disclaimer, the term of this patent is extended or adjusted under 35 U.S.C. 154(b) by 911 days.

(21) Appl. No.: 13/127,857

(22) PCT Filed: Nov. 10, 2009

(86) PCT No.: PCT/EP2009/064915
§ 371 (c)(1),
(2), (4) Date: Jul. 7, 2011

(87) PCT Pub. No.: WO2010/052338
PCT Pub. Date: May 14, 2010

(65) Prior Publication Data
US 2012/0001481 A1    Jan. 5, 2012

Related U.S. Application Data

(60) Provisional application No. 61/112,944, filed on Nov. 10, 2008.

(30) Foreign Application Priority Data

Nov. 10, 2008  (DE) .................. 10 2008 043 626

(51) Int. Cl.
*H02J 9/06* (2006.01)
*H02P 9/00* (2006.01)

(52) U.S. Cl.
CPC ............ *H02J 9/062* (2013.01); *H02P 9/007* (2013.01); *B64D 2221/00* (2013.01); *H02P 2009/005* (2013.01)
USPC ....................................... 307/9.1

(58) Field of Classification Search
USPC ................................... 307/9.1
See application file for complete search history.

(56) References Cited

U.S. PATENT DOCUMENTS 3,571,693 A   3/1971  Riaz
4,357,524 A   11/1982 Apfelbeck et al.
(Continued)

FOREIGN PATENT DOCUMENTS

DE   30 42 927    6/1982
DE   298 21 952   11/1999
(Continued)

OTHER PUBLICATIONS

Office Action of German priority application 10 2008 043 626.7-32.
(Continued)

*Primary Examiner* — Jared Fureman
*Assistant Examiner* — Duc M Pham
(74) *Attorney, Agent, or Firm* — Greer, Burns & Crain Ltd.

(57) ABSTRACT

A power distribution device has a number N1 of conversion devices comprising a respective cascade generator for converting a first part of a mechanical power into a first electrical power with an alternating voltage of constant amplitude and constant frequency, and comprising a respective frequency converter for supplying a second electrical power with the alternating voltage of constant amplitude and constant frequency as a function of a second part of the mechanical power; a number N2 of constant frequency buses for the respective transfer of the electrical power of constant frequency supplied by the at least one conversion device to a number N3 of loads which comprises at least a number N4 of loads to be controlled in terms of their power consumption; and a number N4 of control devices, wherein the respective control device is coupled between the respective load to be controlled and the constant frequency bus and is designed to control the power consumption of the load to be controlled.

15 Claims, 2 Drawing Sheets

(56) References Cited

U.S. PATENT DOCUMENTS

| | | | |
|---|---|---|---|
| 5,013,973 A * | 5/1991 | Stopa | 315/241 R |
| 6,559,559 B2 | 5/2003 | Cratty | |
| 7,116,003 B2 * | 10/2006 | Hoppe | 290/1 A |
| 2002/0014802 A1 * | 2/2002 | Cratty | 307/43 |
| 2004/0129835 A1 | 7/2004 | Atkey et al. | |
| 2006/0192535 A1 * | 8/2006 | Lando | 322/29 |
| 2008/0111421 A1 * | 5/2008 | Anghel et al. | 307/23 |
| 2009/0127855 A1 * | 5/2009 | Shander et al. | 290/7 |

FOREIGN PATENT DOCUMENTS

| | | |
|---|---|---|
| EP | 0 957 026 | 11/1999 |
| EP | 1 921 742 | 5/2008 |
| WO | WO 2008/131799 | 11/2008 |

OTHER PUBLICATIONS

Chinese Office action, Mar. 21, 2013.

* cited by examiner

POWER DISTRIBUTION DEVICE FOR DISTRIBUTING POWER AND A METHOD FOR THE DISTRIBUTION OF POWER

CROSS-REFERENCE TO RELATED APPLICATIONS

This application claims the benefit of U.S. Provisional Application No. 61/112,944, filed Nov. 10, 2008 and German Patent Application No. 10 2008 043 626.7, filed Nov. 10, 2008, the entire disclosures of which are herein incorporated by reference.

FIELD OF THE INVENTION

The present invention relates to a power distribution device for distributing power, and to a method for the distribution of power.

Although it can be applied in any sectors, the present invention is described in more detail in relation to an aircraft or a passenger aircraft.

Conventional electrical power distribution devices or power distribution networks can be divided into three main groups. Firstly, alternating voltage networks with a constant line frequency are known. Secondly, alternating voltage networks with variable frequency are known, and thirdly direct voltage networks are known.

The first approach described above, the alternating voltage network of constant frequency, has the particular advantage over an alternating voltage network with variable frequency that all loads which need to be operated with constant voltage and speed during the aircraft flight can be connected directly to the power distribution network. These loads include fuel pumps, hydraulic pumps or fans, for example.

These loads are designed to operate at constant speed. This is automatically the case when they are connected directly to a constant frequency network. A disadvantage of variable frequency networks is that converters need to be used. These reduce efficiency and also increase the cost and overall weight of the aircraft in addition to increasing technical complexity.

In order to set up a constant frequency network, what are known as integrated drive generators (IDGs) are traditionally used, which basically consist of a constant speed gear unit and a generator. In this system, conversion from a variable speed to a constant speed takes place on the generator's mechanical input side. It is also important to have different electrical energy sources available for the aircraft during the flight in order to satisfy current and future requirements.

This is not possible with one engine generator alone and requires a combination of other energy sources.

In more recent developments, such as the Airbus A380, IDGs have been replaced by generators without constant speed gear units, so-called variable frequency generators (VFGs), which are able to cover the required speed range, for example factor 2, and establish a corresponding network with variable frequency. This does, admittedly, save on the expense of the IDG, but also requires the use of converters for many loads, which can once again have a detrimental effect on initial costs, service costs, the overall weight and operating reliability.

As mentioned above, the direct voltage network is an alternative to alternating voltage networks. However, as neither direct voltage motors nor direct voltage generators with commutators should be used in commercial aircraft, since these are very maintenance-intensive and thus cost-intensive due to the carbon brushes they require, brushless direct voltage technology is used.

In this case the generator or motor is operated with alternating voltage which is generated by special motor control devices from a direct voltage network, for example 270 V.

The combination of a direct voltage network and an alternating voltage generator on one side and a brushless direct voltage motor on the other side results in what is known as multiple power conversion. A direct voltage is initially generated from the generator alternating voltage by means of a rectifier and this voltage is then distributed accordingly to the motor control devices of the relevant components. However, the disadvantage of this multiple conversion is that it causes additional energy losses and requires further technical outlay, which can disadvantageously lead to further initial and service costs and extra weight.

These motor control devices then generate the individual alternating voltage to drive and control the motor itself.

In any event, such direct voltage networks have the disadvantage that during switching operations arcing can occur which is not extinguished automatically, but requires complex switching elements to suppress it.

These switching elements which are additionally required disadvantageously lead to further initial and service costs and can also give rise to extra weight. Furthermore, these necessary switching units cannot yet be used fully in aviation because they have not yet reached the necessary level of service series maturity for use in the aviation industry.

Documents U.S. Pat. Nos. 5,977,645 A, 7,116,003 B2 and 7,210,653 B2 describe combinations of the above-mentioned networks. Documents U.S. Pat. Nos. 3,571,693 A, 5,627,744 A and 7,045,925 B2 also describe constant frequency networks in which the conversion of variable to constant frequency takes place on the generator's electrical output side.

Document U.S. Pat. No. 4,357,524 illustrates an electric heat control device for heat control of an aircraft window. Document DE 198 21 952 C2 further describes a power supply unit on board an aircraft.

SUMMARY OF THE INVENTION

On the whole, the object of the present invention is to provide a more efficient distribution of power in an aircraft.

A power distribution device for distributing power, in particular in an aircraft, is accordingly proposed which comprises:

a number, N1, of conversion devices comprising a respective cascade generator for converting a first part of a mechanical power provided into a first electrical power with an alternating voltage of constant amplitude and constant frequency, and comprising a respective frequency converter for providing a second electrical power with the alternating voltage of constant amplitude and constant frequency as a function of a second part of the mechanical power provided;

a number, N2, of constant frequency buses for the respective transfer of the electrical power of constant frequency supplied by the at least one conversion device to a number, N3, of loads which comprises at least a number, N4, of loads to be controlled in terms of their power consumption; and a number, N4, of control devices, wherein the respective control device is coupled between the respective load to be controlled and the constant frequency bus and is designed to control the power consumption of the load to be controlled.

An aircraft comprising a power distribution network is further proposed which comprises a power distribution device as described above.

A method for the distribution of power, in particular in an aircraft, is further proposed and comprises the following steps:

a) providing a number, N1, of conversion devices comprising a respective cascade generator for converting a first part of a mechanical power provided into a first electrical power with an alternating voltage of constant amplitude and constant frequency, and comprising a respective frequency converter for providing a second electrical power with the alternating voltage of constant amplitude and constant frequency as a function of a second part of the mechanical power provided;

b) providing a number, N2, of constant-frequency buses for the respective transfer of the electrical power of constant frequency supplied by the at least one conversion device to a number, N3, of loads which comprises a number, N4, of loads to be controlled in terms of their power consumption;

c) arranging a respective control device between the respective load to be controlled and the constant frequency bus; and d) controlling the power consumption of the load to be controlled by means of the arranged control device.

One advantage of the present invention is that the power distribution device according to the invention and the method according to the invention for the distribution of power combine the advantages of a constant-frequency network with the advantages of a generator without a constant speed gear unit. In accordance with the invention it is also possible to couple a fuel cell, as an additional energy source, to the power distribution device according to the invention.

A further advantage of the present invention is that, in the power distribution device according to the invention, only one single network type, i.e. an alternating voltage network of constant line frequency, is used for power distribution and thus it is not necessary to perform conversions between power networks. This advantageously results in considerably reduced energy losses in the power distribution network according to the invention and in the power distribution device according to the invention.

A power which is highly reduced compared to the total power provided and which would have to be fed via converters emerges as a further advantage from the architecture of the power distribution device according to the invention. These converters can thus also be configured so as to be correspondingly smaller, which makes it possible to further reduce energy losses. This advantageously minimises the cost required for cooling measures, and ultimately also reduces the total weight of the aircraft and therefore the costs associated therewith.

As explained in greater detail below, the power supply device may also incorporate one or more fuel cells in its network architecture which make it possible to adjust the power supplied to the individual buses flexibly to the power requirements of the associated loads. This results in improved utilisation of the available power and increased redundancy.

The use of a three-phase system, such as the AC network of constant frequency according to the invention, as the only network type further makes it possible to provide three different voltage systems without having to provide a specific converter. It is thus possible to achieve more efficient adaptation to the requirements of the associated loads than in a direct voltage network, for example.

On the whole, the proposed architecture of the power distribution device of the present invention thus makes it possible to reduce the complexity of the power supply network of the aircraft.

In accordance with the invention a separate control device or control means is provided for each load to be controlled and is dimensioned precisely for this load. This results in reduced development costs and separate design of the individual control devices is possible.

As described above, in the device according to the invention 'cascade generators' are used which are based on the engine design described in the Fräger, Carsten publication: "Neuartige Kaskadenmaschine für bürstenlose Drehzahlstellantriebe mit geringem Stromrichteraufwand", Dusseldorf, VDI, 1995, and in document U.S. Pat. No. 7,045,925 B2, and of which the possibility for use as a generator is shown in Fräger, Carsten "Kaskadengenerator für Windenergieanlagen", Drive and Circuit Engineering, vol. S2/2006, Berlin, VDI. The advantage of this arrangement is that the primary power of the generator is fed directly into the network with the synchronous frequency of the generator, of which the shaft is coupled to the aircraft engine, and only the differential power has to be fed via the frequency convertor. This means that the frequency converter can be designed to be considerably smaller, thus reducing thermal losses and the weight to be installed. In this case, the engine, the generator and the gear unit connected between the two are preferably designed such that the generator is driven at synchronous speed when the engine is operating at cruising speed.

The AC network at constant frequency according to the invention is proposed for the buses, namely the constant frequency buses, since this network is well suited for operation of loads, such as motors or cascade motors, and also provides three different voltage systems without conversion. These are preferably the full three-phase system, a single-phase alternating voltage system with phase-to-phase voltage and a similar system with a voltage which is smaller by a factor of $1/\sqrt{3}$. The voltage level for the buses can preferably be freely adjusted, but a network voltage of 230/400 volts is suggested to achieve lower currents and thus a reduced cable weight compared with traditional 115/200 volt networks. This provides a variety of voltage systems for the use of different voltages for the individual loads. Accordingly, every load can be supplied with the most suitable voltage for it, thus enabling the system as a whole to be further optimised. In addition to constant frequency buses, the connection of at least one low volt direct voltage network with a preferred voltage of 28 volts is proposed to supply the avionics and other electrical control and monitoring units, for example.

The dependent claims relate to advantageous configurations and improvements of the invention.

According to a preferred development, a power supply device with a plurality of power supply units for respectively supplying the electrical power of constant frequency is provided, with the respective power supply unit being designed as one of a number, N1, of conversion devices and/or as one of a number, N5, of fuel cells and/or as one of a number, N6, of connections for coupling an external power source to supply electrical power of constant frequency.

Advantageously, converters do not need to be provided for the connections for coupling one or more external power sources, as the approach according to the invention provides that any conversion relating to the external supply takes place on the ground in a corresponding ground supply unit. This has the advantage that components which are only required on the ground do not travel with the aircraft on the flight and thus do not unnecessarily increase the aircraft's fuel consumption or lead to increased development and maintenance costs for the aircraft. This is a particular benefit on long-haul aircraft and is also easy to achieve due to the comparatively small number of hub airports. The incorporation of one or more fuel cells as mentioned above helps to fulfil the requirement for a second independent energy source. This can then preferably take over the role of emergency supply and also the role of the auxiliary power unit if designed accordingly. As a general principle, a fuel cell supplies direct voltage, conversion will be necessary in this case in order to feed into the intended AC network at constant frequency. The fuel cell is preferably designed such that the supplied voltage can be converted to the selected network voltage by inversion alone and such that a transformer is not required.

According to a further preferred development, a controllable switching device is provided which is designed to switch a respective power supply unit to a respective one of the number, N2, of constant frequency buses.

As a result of the switching device or switching logic according to the invention, it is possible to supply each of the available buses from each of the sources in the power supply device. However, in this case two engine generators should not feed the same bus at the same time or be connected to the external supply, as this would require synchronisation of the actual voltage and phase position to avoid damaging the components. However, further technical measures would be necessary to ensure synchronisation of this kind, with corresponding effects on increased weight, cost and power losses. The present invention therefore does not connect the networks in this field. However, by constructing the fuel cell inverter accordingly, it is possible both to supply a bus from a fuel cell stack alone and to supply it from a fuel cell stack combined with one of the other sources. In this case, the inverter is preferably operated as a self-commutated inverter in the first instance and as an externally commutated inverter in the second instance in combination with another source.

In accordance with a further preferred development the number, N4, of loads to be controlled in terms of their power consumption has a first quantity, U1, of cascade motors to be controlled and a second quantity, U2, of loads to be controlled, which can be controlled within a range of 0% to 100% of their power consumption.

In accordance with a further preferred development the respective control device, which is coupled between the respective constant frequency bus and the respective cascade motor, is configured as a frequency converter.

In accordance with a further preferred development the respective control device, which is coupled between the respective constant frequency bus and a respective one of the second quantity, U2, of loads to be controlled, is configured as a phase control.

In accordance with a further preferred development the number, N3, of loads comprises the number, N4, of loads to be controlled in terms of their power consumption and a number, N7, of uncontrolled loads.

Three different principles are applied for connection of the different loads, wherein the respective principle to be applied depends on how the respective load is to be controlled. Uncontrolled loads which are merely to be switched on and off can be connected directly to the respective bus. The connected motors operate, as exemplary loads, at constant speed since they are powered directly by the constant frequency network. All other uncontrolled loads are also supplied with a constant voltage and constant frequency. The loads to be controlled are controlled within different operating points. These require conversion by means of the corresponding control device, the construction of which depends on the size of the required control range. If the factor between minimum and maximum speed required of the motor is less than or equal to 2, the above-described cascade motor approach is used. The power to be converted can thus be reduced considerably and the convertor can be designed to be correspondingly small. For those loads which are to be controlled within a wide speed range, for example from 0% to 100%, a phase control is used which makes it possible to achieve relatively effective conversion of the alternating voltage of the bus into the voltage required in the respective control state.

According to a further preferred development the number, N2, of constant frequency buses contains a first quantity, M1, of main buses and a second quantity, M2, of emergency buses.

In accordance with a further preferred development the controllable switching device switches the respective power supply unit, as a function of an established load distribution, to a respective one of the number, N2, of constant frequency buses.

By selecting the fuel cell inverter accordingly, it is preferably possible both to supply a bus from a fuel cell stack alone and to supply it from a fuel cell stack combined with another source. In this case, the inverter is operated as a self-commutated inverter in the first instance and as an externally commutated inverter in the second instance in combination with another source.

According to a further preferred development a number, N5, of fuel cells is provided, with the respective fuel cell being coupled to the switching device by means of an inverter.

According to a further preferred development the respective inverter is designed as an externally commutated inverter.

In accordance with a further preferred development at least one transformer-rectifier device is provided which couples one of the number, N2, of the constant frequency buses to a low volt direct voltage network. The number of transformer-rectifier devices is preferably equal to N2.

In accordance with a further preferred development at least one mechanical supply device is provided for supplying the mechanical power and preferably comprises an aircraft engine.

BRIEF DESCRIPTION OF THE DRAWINGS

In the following, the invention will be described in further detail on the basis of embodiments with reference to the accompanying figures of the drawings, in which.

DESCRIPTION OF EXEMPLARY EMBODIMENTS

Figure 1:
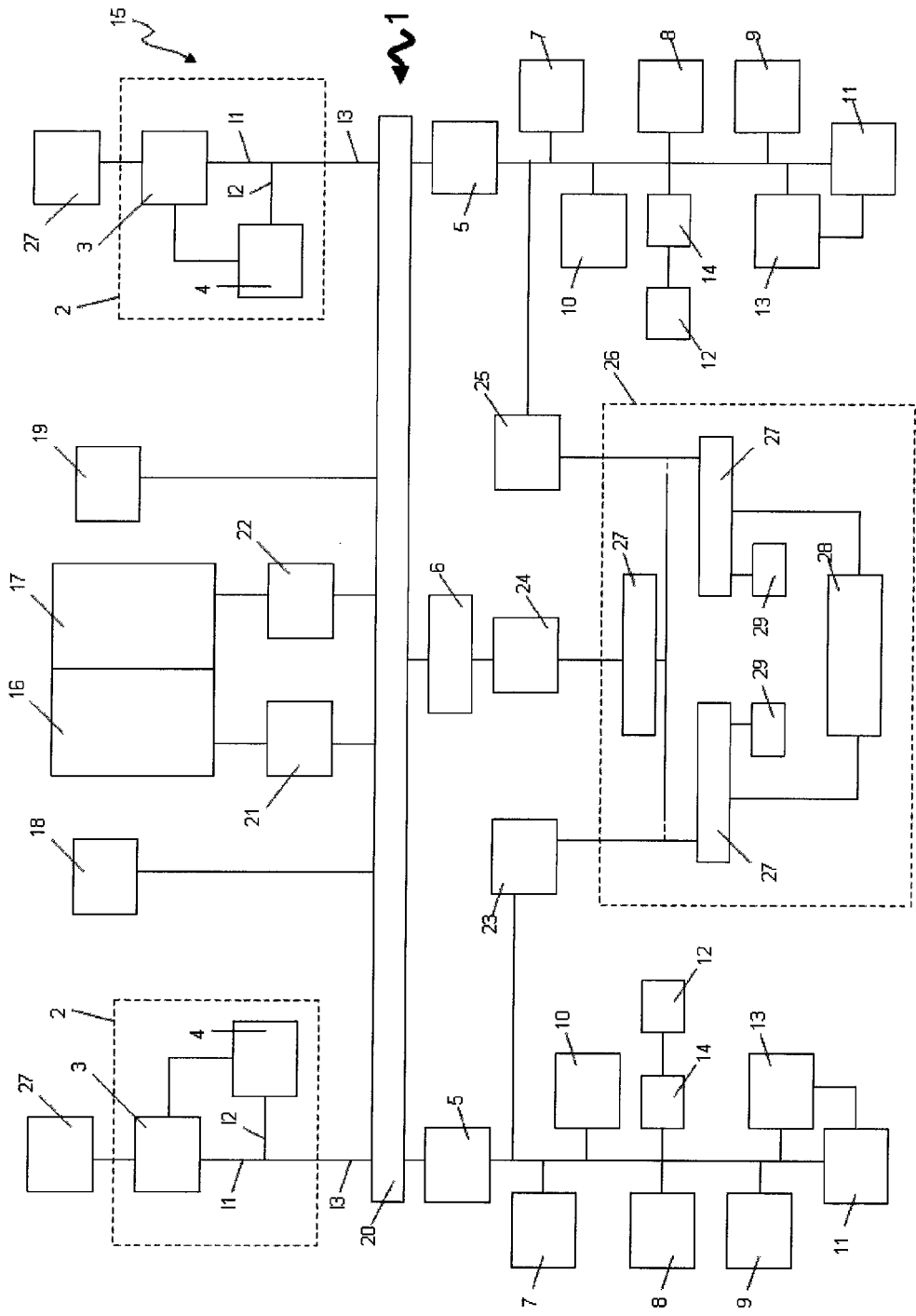
FIG. 1 is a schematic block diagram of an embodiment of a power distribution device for distributing power in an aircraft.

In the figures, like reference numerals denote like or functionally identical components, unless indicated otherwise.

The power distribution device 1 has a number, N1, of conversion devices 2, a number, N2, of constant frequency buses 5, 6 and a number, N4, of control devices 13, 14.

The conversion device 2 has a cascade generator 3 and a frequency converter 4 coupled to the cascade generator 3.

The cascade generator 3 is designed for the conversion, in particular for the direct conversion, of a first part of a mechanical power provided into an electrical power I1 having an alternating voltage of constant amplitude and constant frequency. The frequency converter 4 is designed to supply a second electrical power I2 with the alternating voltage of constant amplitude and constant frequency as a function of a second part of the mechanical power provided, in such a way that deviations in the speed of the input shaft from the synchronous speed are offset. The power I3, as a starting power of the conversion device 2 according to FIG. 1, is given as the sum of the first electrical power I1 and the second electrical power I2.

The respective constant frequency bus 5, 6 is designed to transmit the electrical power I3 of constant frequency supplied by the at least one conversion device 2 to a number, N3, of loads 7-12 which comprises at least a number, N4, of loads 11, 12 to be controlled in terms of their power consumption.

The respective control device 13, 14 is coupled between the respective load 11, 12 to be controlled and the respective constant frequency bus 5, 6. In this instance the control device 13, 14 is designed to control the power consumption of the load 11, 12 to be controlled.

The power distribution device 1 preferably has a power supply device 15 comprising a plurality of power supply units 2, 16-19. The respective power supply unit 2, 16-19 is, for example, a conversion device 2, a fuel cell 16, 17 or a connection 18, 19 for coupling an external power source for the supply of an electrical power of constant frequency.

The power distribution device 1 preferably also comprises a controllable switching device 20 which is designed to switch a respective power supply unit 2, 16-19 to a respective one of the number, N2, of the constant frequency buses 5, 6. The controllable switching device 20 preferably switches as a function of a specific or established load distribution within the network.

The number, N4, of the loads 11, 12 to be controlled in terms of their power consumption has a first quantity, U1, of cascade motors 11 to be controlled and a second quantity, U2, of loads 12 to be controlled, which can be controlled or are to be controlled within a range of 0 to 100% of their power consumption.

The respective control unit 13, which is coupled between the respective constant frequency bus 5, 6 and the respective cascade motor 11, is configured as a frequency converter 13.

By contrast, the respective control device 14, which is coupled between the respective constant frequency bus 5, 6 and a respective one of the second quantity, U2, of the loads 12 to be controlled, is configured as a phase control 14.

The number, N3, of loads 7-12 has the number, N4, of loads 11, 12 to be controlled in terms of their power consumption and a number, N7, of uncontrolled loads 7-10. The uncontrolled loads 7-10 comprise, for example, a fuel pump or a hydraulic pump.

The number, N2, of the constant frequency buses 5, 6 comprises a first quantity, M1, of main buses 5 and a second quantity, M2, of emergency buses 6.

Without loss of generality, the individual numbers N1-N8, the quantities M1, M2 and the quantities U1, U2 which can be seen from FIG. 1 are only exemplary and do not limit the invention.

The power distribution device 1 further has a number, N8, of fuel cells 16, 17, wherein the respective fuel cell 16, 17 is coupled to the switching device 20 by means of an inverter 21, 22. The respective inverter 21, 22 is preferably designed as an externally commutated inverter.

The power distribution device 1 can further preferably comprise a number of transformer-rectifier devices 23-25, wherein the respective transformer-rectifier device 23-25 couples one of the number, N2, of the constant frequency buses 5, 6 to at least one low volt direct voltage network 26.

The low volt direct voltage network 26 preferably comprises direct voltage buses 27, batteries 29 and a corresponding load, for example the avionics 28.

In particular, mechanical power for the power distribution device 1 is provided in a coupled manner by a number of aircraft engines. The coupling is preferably formed between one of the engines and at least a respective one of the number, N1, of conversion units via a mechanical shaft.

Figure 2:
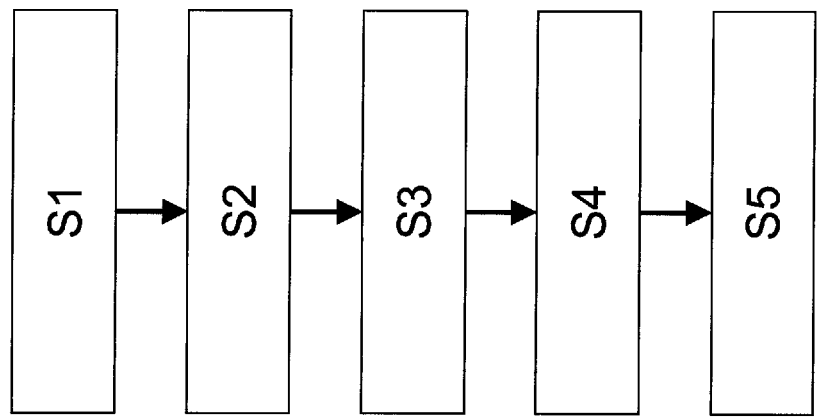
FIG. 2 is a schematic flow chart of an embodiment of a method for the distribution of power in an aircraft.

FIG. 2 shows a schematic flow chart of an embodiment for the distribution of power within an aircraft.

The method according to the invention is explained below with the aid of the block diagram in FIG. 2 with reference to the block diagram in FIG. 1. The method according to the invention as shown in FIG. 2 has the following method steps, S1 to S5:

Method Step S1:

A number, N1, of conversion devices 2 is provided. The respective conversion device 2 has a cascade generator 3 for converting a first part of a mechanical power provided into a first electrical power I1 having an alternating voltage of constant amplitude and constant frequency, and comprises a respective frequency converter 4 for supplying a second electrical power I2 having the alternating voltage of constant amplitude and constant frequency as a function of a second part of the mechanical power provided, in such a way that deviations in the speed of the input shaft from the synchronous speed are offset.

Method Step S2:

A number, N2, of constant frequency buses 5, 6 is provided, wherein the respective constant frequency bus 5, 6 is designed to transfer the electrical power I3 (I3=I1+I2) of constant frequency supplied by the at least one conversion device 2 to a number, N3, of loads 7-12. The number, N3, of loads 7-12 comprises at least a number, N4, of loads 11, 12 to be controlled in terms of their power consumption.

Method Step S3:

A controllable switching device 20 is preferably provided which is designed to switch a respective conversion device 2 to a respective constant frequency bus 5, 6.

A power supply device 15 with a plurality of power supply units 2, 16-19 for respectively supplying the electrical power I3 of constant frequency is further preferably provided, the respective power supply unit being designed as one of the number, N1, of conversion devices 2 and/or as one of a number, N5, of fuel cells 16, 17 and/or as one of a number, N6, of connections 18, 19 for coupling an external power source to supply electrical power of constant frequency. The controllable switching device or switching logic is preferably designed to switch a respective power distribution unit 2, 16-19 to a respective one of the number, N2, of constant frequency buses 5, 6. As a result of the switching device 20 or switching logic according to the invention, it is possible to supply each of the available buses 5, 6 from each of the sources in the power supply units 2, 16-19.

Method Step S4:

A respective control device 13, 14 is arranged between the respective load 11, 12 to be controlled and the respective constant frequency bus 5, 6.

Method Step S5:

The power consumption of the load 11, 12 to be controlled is controlled by means of the arranged control device 13, 14.

Although the present invention has been described on the basis of preferred embodiments, it is not restricted thereto, but can be modified in many different ways.

LIST OF REFERENCE NUMERALS 1 power distribution device
2 conversion device
3 cascade generator
4 frequency converter
5, 6 constant frequency bus
7-10 uncontrolled load
11, 12 controlled load
13, 14 control device 15 power supply device
16, 17 fuel cell
18, 19 (external) connection
20 switching device
21, 22 inverter
23-25 transformer-rectifier device
26 low volt direct voltage network
27 direct voltage bus
28 computer electronics device, in particular avionics
29 battery

The invention claimed is:

1. A power distribution device for distributing power, in particular in an aircraft, and comprising:
    a) a number, N1, of conversion devices comprising a respective cascade generator for converting a first part of a mechanical power provided into a first electrical power (I1) with an alternating voltage of constant amplitude and constant frequency, and comprising a respective frequency converter for supplying a second electrical power (I2) with the alternating voltage of constant amplitude and constant frequency as a function of a second part of the mechanical power provided;
    b) a number, N2, of constant frequency buses for the respective transfer of the electrical power (I3) of constant frequency supplied by the at least one conversion device to a number, N3, of loads which comprises at least a number, N4, of loads to be controlled in terms of their power consumption; and
    c) a number, N4, of control devices, the respective control device being coupled between the respective load to be controlled and the constant frequency bus and being designed to control the power consumption of the load to be controlled;
    wherein a power supply device with a plurality of power supply units for respectively supplying the electrical power (I3) of constant frequency is provided, with the respective power supply unit being designed as one of the number, N1, of conversion devices and/or as one of a number, N5, of fuel cells and/or as one of a number, N6, of connections for coupling an external power source to supply an electrical power of constant frequency,
    wherein a controllable switching device is provided which is designed to switch a respective power supply unit to a respective one of the number, N2, of constant frequency buses, such that anyone of the constant frequency buses can be supplied by any one of the plurality of power supply units.

2. The power distribution device according to claim 1, wherein the number, N4, of loads to be controlled in terms of their power consumption has a first quantity, U1, of cascade motors to be controlled and/or a second quantity, U2, of loads to be controlled, which can be controlled within a range of 0% to 100% of their power consumption.

3. The power distribution device according to claim 2, wherein the respective control device, which is coupled between the respective constant frequency bus and the respective cascade motor, is configured as a frequency converter.

4. The power distribution device according to claim 2, wherein the respective control device, which is coupled between the respective constant frequency bus and a respective one of the second quantity, U2, of the loads to be controlled, is configured as a phase control.

5. The power distribution device according to claim 2, wherein the number, N3, of loads comprises the number N4 of loads to be controlled in terms of their power consumption and a number, N7, of uncontrolled loads.

6. The power distribution device according to claim 1, wherein the number, N2, of constant frequency buses comprises a first quantity, M1, of main buses and a second quantity, M2, of emergency buses.

7. The power distribution device according to claim 1, wherein the controllable switching device switches the respective power supply unit to a respective one of the number, N2, of constant frequency buses as a function of a load distribution established.

8. The power distribution device according to claim 1, wherein a number, N8, of fuel cells is provided, the respective fuel cell being coupled to the switching device by means of an inverter.

9. The power distribution device according to claim 8, wherein the respective inverter is configured as an externally commutated inverter.

10. The power distribution device according to claim 1, wherein at least one transformer-rectifier device is provided which couples one of the number, N2, of the constant frequency buses to at least one low volt direct voltage network.

11. The power distribution device according to claim 1, wherein at least one mechanical supply device is provided for supplying the mechanical power.

12. An aircraft with a power distribution network which has a power distribution device according to claim 1.

13. A method for the distribution of power, in particular in an aircraft, said method comprising the following steps:
    a) providing a number, N1, of conversion devices comprising a respective cascade generator for converting a first part of a mechanical power provided into a first electrical power (I1) with an alternating voltage of constant amplitude and constant frequency, and comprising a respective frequency converter for supplying a second electrical power with the alternating voltage of constant amplitude and constant frequency as a function of a second part of the mechanical power provided;
    b) providing a number, N2, of constant frequency buses for the respective transfer of the electrical power of constant frequency supplied by the at least one conversion device to a number, N3, of loads which comprises at least a number, N4, of loads to be controlled in terms of their power consumption;
    c) arranging a respective control device so as to be coupled between the respective load to be controlled and the constant frequency bus; and
    d) controlling the power consumption of the load to be controlled by means of the arranged control device;
    e) providing by a power supply device with a plurality of power supply units the electrical power (I3) of constant frequency, with the respective power supply unit being designed as one of a number, N1, of conversion devices and/or as one of a number, N5, of fuel cells and/or as one of a number, N6, of connections for coupling an external power source to supply to supply an electrical power of constant frequency
    f) switching by a controllable switching device a respective power supply unit to a respective one of the number, N2, of constant frequency buses, such that anyone of the constant frequency buses can be supplied by any one of the plurality of power supply units.

14. The power distribution device according to claim 8, wherein the inverter is configured as a self-commutated inverter.

15. The power distribution device according to claim 11, wherein the at least one mechanical supply device comprises an aircraft engine.

* * * * *